(12) United States Patent
Lin

(10) Patent No.: US 8,845,210 B2
(45) Date of Patent: Sep. 30, 2014

(54) OPTICAL CONNECTOR WITH REDUCED INSERTION LOSS

(71) Applicant: I-Thun Lin, New Taipei (TW)

(72) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 115 days.

(21) Appl. No.: 13/631,772

(22) Filed: Sep. 28, 2012

(65) Prior Publication Data

US 2013/0330048 A1 Dec. 12, 2013

(30) Foreign Application Priority Data

Jun. 8, 2012 (TW) .............................. 101120742 A

(51) Int. Cl.
*G02B 6/36* (2006.01)
(52) U.S. Cl.
USPC ............................................................ 385/88
(58) Field of Classification Search
USPC ............................................................ 385/88
See application file for complete search history.

(56) References Cited

U.S. PATENT DOCUMENTS

2012/0063718 A1* 3/2012 Steijer et al. .................... 385/14
2012/0301073 A1* 11/2012 DeMeritt et al. ................ 385/14

* cited by examiner

*Primary Examiner* — Uyen Chau N Le
*Assistant Examiner* — Hoang Tran
(74) *Attorney, Agent, or Firm* — Novak Druce Connolly Bove + Quigg LLP

(57) ABSTRACT

An optical connector includes a fastener, a first housing, and a second housing. The fastener includes a base plate, two engagement arms extending up from a side of the base plate and then bent toward a first direction, and two limiting arms extending from another side of the base plate toward the first direction and bent up and then bent toward a second direction reverse to the first direction. The first housing and the second housing are aligned and engaged with each other. The first housing is limited by the limiting arms. The second housing defines two engagement grooves with a depth thereof gradually decreasing from an end toward another end of the second housing. Each engagement arm slides into and along a corresponding engagement groove until each engagement arm is totally received in the engagement groove and presses the second housing toward the base plate.

2 Claims, 3 Drawing Sheets

OPTICAL CONNECTOR WITH REDUCED INSERTION LOSS

BACKGROUND

1. Technical Field

The present disclosure relates to optical connectors, and particularly to an optical connector that can decrease insertion loss.

2. Description of Related Art

Optical connectors include a photoelectric module and an optical fiber module. The photoelectric module includes a first housing and a photoelectric conversion chip. The first housing is transparent and forms a lens. The photoelectric conversion chip is housed in the first housing and emits or detects light via the lens. The optical fiber module includes a second housing and an optical fiber. The optical fiber is housed in the second housing. In assembly, the first housing and the second housing are engaged with each other so that the lens aligns with the optical fiber to reduce insertion loss of light transmission between the lens and the optical fiber. However, when the first housing and the second housing are fastened to an external element of the optical connector, the first housing and the second housing may be forced to tilt relative to each other and misalign from each other, increasing the insertion loss.

Therefore, it is desirable to provide an optical connector, which can overcome the above-mentioned shortcomings.

DETAILED DESCRIPTION

Embodiments of the disclosure will be described with reference to the accompanying drawings.

Figure 1:
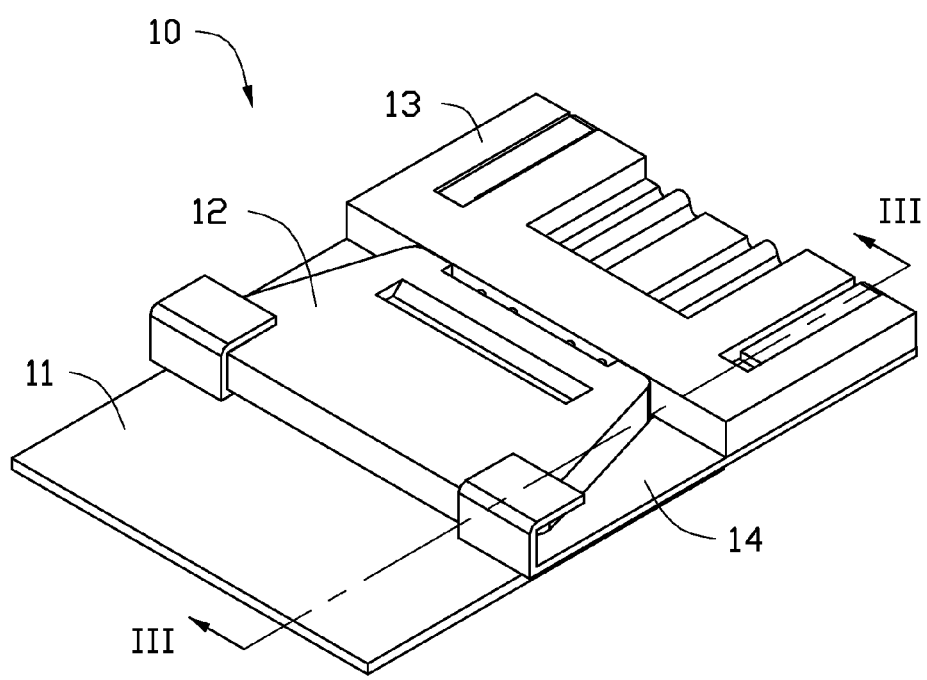
FIG. 1 is an isometric schematic view of an optical connector, according to an embodiment.
Figure 2:
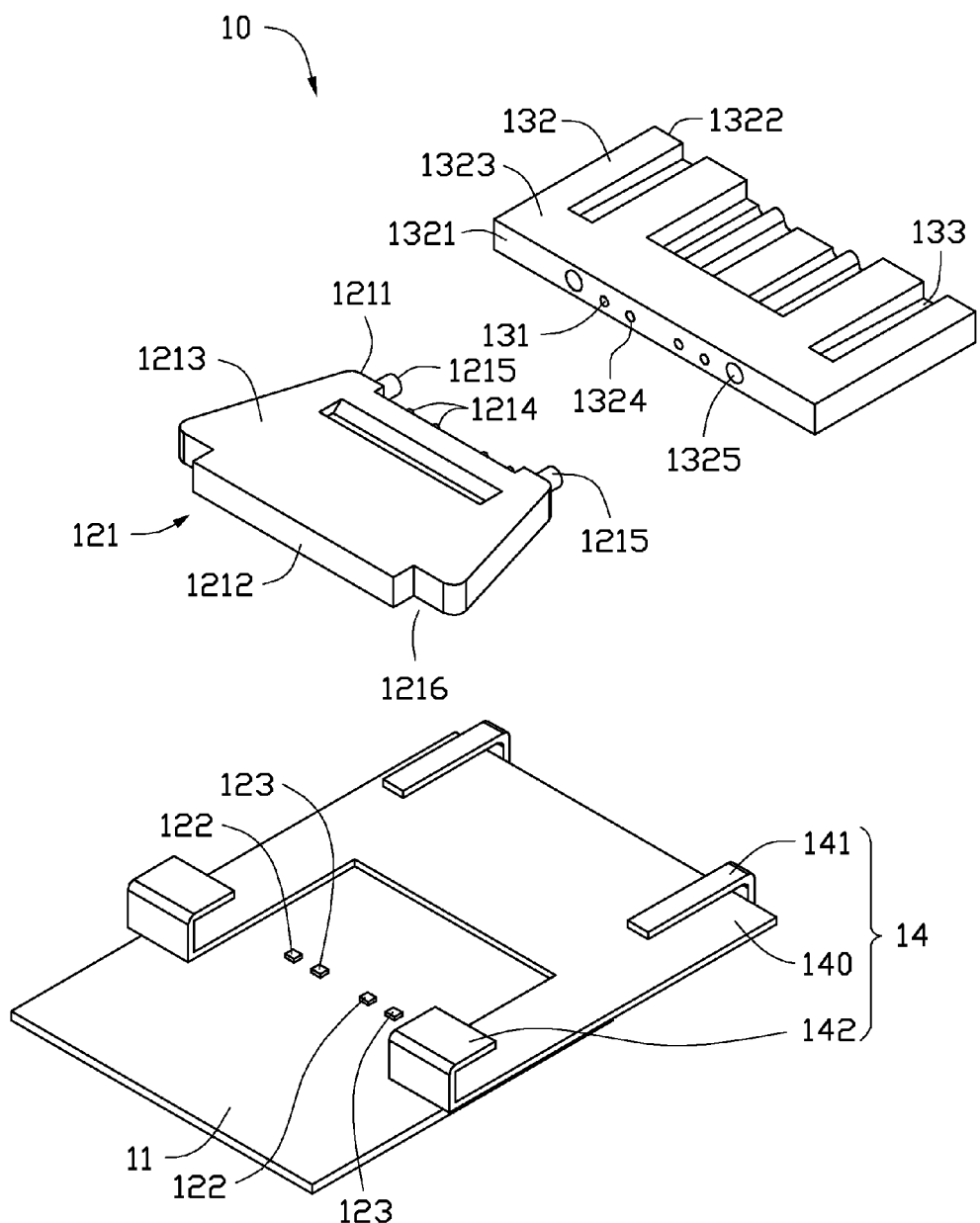
FIG. 2 is an isometric, exploded, schematic view of the optical connector of FIG. 1.
Figure 3:
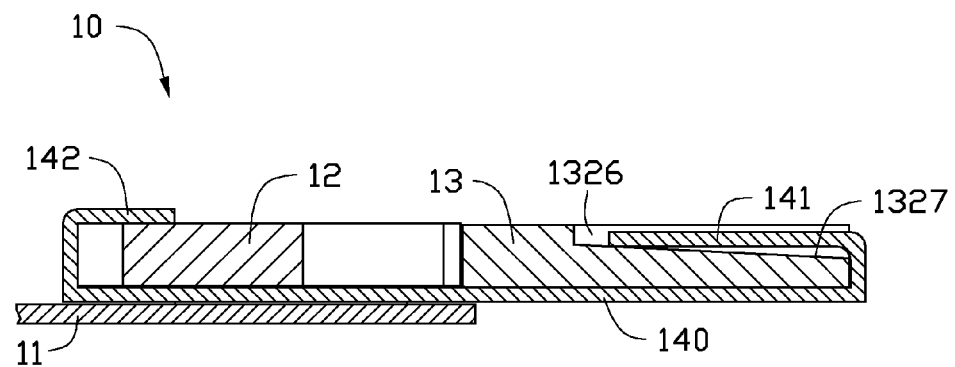
FIG. 3 is a cross-sectional schematic view of the optical connector of FIG. 1.

Referring to FIGS. 1-3, an optical connector 10, according to an embodiment, includes a printed circuit board (PCB) 11, a photoelectric module 12, an optical fiber module 13, and a fastener 14.

The photoelectric module 12 includes four photoelectric conversion chips and a first housing 121.

The four photoelectric conversion chips include two laser diodes 122 and two photo diodes 123.

The first housing 121 is made of transparent material. The first housing 121 is generally cubic and includes a first connecting end 1211, a first rear end 1212 opposite to the first connecting end 1211, and a first upper surface 1213 connecting to the first connecting end 1211 and the first rear end 1212. The first housing 121 forms four lenses 1214 and two engagement pins 1215 protruding from the first connecting end 1211. The lenses 1214 correspond to the photoelectric conversion chips, respectively. The first housing 121 also defines two cutouts 1216 at two corners of the first upper surface 1213, adjacent to the first rear end 1212.

The optical fiber module 13 includes four optical fibers 131, spatially corresponding to the lenses 1214, and a second housing 132 housing the optical fibers 131.

The second housing 132 is substantially cubic and includes a second connecting end 1321, a second rear end 1322 opposite to the second connecting end 1321, and a second upper surface 1323 connecting to the second connecting end 1321 and the second rear end 1322. The second housing 132 defines four through holes 1324 and two engagement holes 1325 in the second connecting end 1321. The through holes 1324 spatially correspond to the lenses 1214 and are configured for holding the optical fibers 131, respectively. The engagement holes 1325 spatially correspond to the engagement pins 1215, respectively. The second housing 132 defines two engagement grooves 133 in the second upper surface 1322. The engagement grooves 133 extend from the second rear end 1322 toward the second connecting end 1321 along a direction that is substantially perpendicular to the second connecting end 1321. A depth of the engagement grooves 133 gradually decreases from the second rear end 1322 toward the second connecting end 1321. That is, a height of a bottom surface 1327 of each of the engagement grooves 133 gradually increases from the second rear end 1322 toward the second connecting ends 1321.

The fastener 14 is made of elastic material, such as stainless steel. The fastener 14 includes a base plate 140, two engagement arms 141, and two limiting arms 142. The base plate 140 is substantially rectangular. The engagement arms 141 extend up from a side of the base plate 140 and are bent about 90 degrees toward a first direction, and are configured to engage with the engagement grooves 133, respectively. The limiting arms 142 extend from another side of the base plate 140 opposite to the engagement arms 141 toward the first direction and are bent up and then backwards and configured for limiting the first housing 121 at the cutouts 1216, respectively.

The length of each engagement arm 141 in the first direction is shorter than the length of each engagement groove 133. The width of each engagement arm 141 is equal to or slightly smaller than the width of each engagement groove 133. The height of each engagement arms 141 is higher than the lowest height of each bottom surface 1327 but is lower than the highest height of each bottom surface 1327.

In assembly, the optical fibers 131 are received and held in the respective through holes 1324. The photoelectric conversion chips are positioned on and electrically connected to the PCB 11. The base pate 140 are adhered to the PCB 11 such that the photoelectric conversional chips are positioned between the limiting arms 142 and arranged along a direction that is substantially perpendicular to the limiting arms 142. The first housing 121 and the second housing 132 are engaged with each other via engagements between the engagement pins 1215 and the engagement holes 1325 such that the lenses 1214 align with the optical fibers 131, respectively. The first housing 121 and the second housing 132 are moved such that the engagement arms 141 slide into and along the respective engagement grooves 133, until portions of the engagements arms 141 in the first direction are totally received in the respective engagement grooves 133 and press the second housing 132 to the PCB 11. The first housing 121 is pressed to the PCB 11 such that the limiting arms 142 pass through the cutouts 1216, respectively, and then the first housing 121 is limited by the limiting arms 142 and fastened to the PCB 11.

In operation, the PCB 11 drives the laser diodes 122 to emit laser beams to the optical fibers 131 via the lenses 1214 according to input data, thus modulating the input data on the emitted laser beams, and demodulates received data from detected laser beams by the photo diodes 123 from the optical fibers 131 via the lenses 1214.

Each photoelectric conversion chip, lens, and optical fiber can work independent from each other, therefore, the number of the photoelectric conversion chips, the lenses 1214, the optical fibers 131, and the through holes 1324 can be set depending on need. For example, in another embodiment, only one photoelectric conversion chip, lens, optical fiber, and through hole are be employed.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical connector, comprising:
   a printed circuit board (PCB);
   a fastener comprising a base plate positioned on the PCB, two engagement arms, and two limiting arms, the two engagement arms extending up from a side of the base plate and then bent toward a first direction, the two limiting arms extending from another side of the base plate opposite to the engagement arms toward the first direction and bent up and then bent toward a second direction reverse to the first direction;
   a photoelectric conversion module comprising a first housing and a photoelectric conversion chip, the first housing comprising a first connecting end, a first rear end opposite to the first connecting end, and a first upper surface connecting the first connecting end an the first rear end, the photoelectric conversion module comprising a lens on the first connecting end, the photoelectric conversion chip being positioned on and electrically connected to the PCB, the first housing being positioned on the PCB and covering the photoelectric chip, the first rear end and the first upper surface abutting the first limiting arms, the photoelectric chip optically aligning with the lens; and
   an optical fiber module comprising a second housing and an optical fiber, the second housing comprising a second connecting end, a second rear end opposite to the second connecting end, and a second upper surface, the second housing defining a through hole in the second connecting end and two engagement grooves in the second upper surface, the optical fiber being received in and held in the through hole, the first connecting end connecting the second connecting end such that the lens aligns with the optical fiber, the engagement grooves extending from the second rear end toward the second connecting end, a depth of each engagement groove gradually decreasing from the second rear end toward the second connecting end, each engagement arm sliding into and along a corresponding engagement groove until portions of the engagement arms in the first direction are totally received in the respective engagement grooves and press the second housing to the PCB.

2. The optical connector of claim 1, wherein the first housing comprises two engagement pins protruding from the first connecting end, the second housing defines two engagement holes in the second connecting end, spatially corresponding to the respective engagement pins, and the first connecting end connects to the second connecting end via engagements between the engagement pins and the engagement holes.

* * * * *